July 8, 1952   D. SEBASTIAN ET AL   2,602,848
FLUID LEVEL INDICATOR
Filed Dec. 14, 1950

INVENTORS
DAVID SEBASTIAN
BERNT J. HEGGEN
ROBERT H. HAMPTON
BY
THEIR ATTORNEY

Patented July 8, 1952

2,602,848

UNITED STATES PATENT OFFICE 2,602,848

FLUID LEVEL INDICATOR

David Sebastian, Bernt J. Heggen, and Robert H. Hampton, Brooklyn, N. Y., assignors of fifteen per cent to Joseph L. Klein, New York, N. Y.

Application December 14, 1950, Serial No. 200,812

7 Claims. (Cl. 177—311)

This invention relates to fluid level indicators, and more particularly to a device for determining the level of liquids.

The specific embodiment of the indicator to be disclosed hereinafter, and shown by way of illustration only, is designed for measuring the level of hydraulic fluid in the supply tank of the hydraulic brake system commonly used in automobiles, trucks and similar vehicles. The purpose of the indicator is to signal the driver of the vehicle whenever the level of the hydraulic fluid falls to or below the danger level—that is, the level below which there is the danger of failure of the brakes due to an inadequate supply of brake fluid.

Several forms of liquid level indicators have been designed to accomplish this purpose, however these devices, for the most part, have inherent disadvantages which preclude their general acceptance. For example, in the well known float-type level indicator, the float becomes gummed by the hydraulic fluid so that the float sticks and thereby renders the indicator inoperative. Several electrically operated indicators have been designed to overcome this disadvantage of the float-type indicator. Of these, some are too expensive and delicate; others depend on the electric conductivity of the fluid for their operation, but the conductivity of the various hydraulic fluids available vary to such a degree as to make such an indicator impractical.

The present invention involves an electrically operated indicator with a single moving part sealed off from the hydraulic or other fluid thereby obviating any possibility of the device becoming inoperable due to the action of the fluid on the indicator. The operation of the device is independent of the electrical conductivity of the fluid. Moreover, the present invention utilizes the fewest possible parts in its design thereby not only minimizing the cost of the device, but also simplifying it to such an extent that the possibility of the indicator becoming inoperable is minimized.

It is one object of this invention to provide a liquid level indicator which is relatively simple and compact in design.

Another object of this invention is to construct the indicator in such a manner that it is readily adaptable to existing hydraulic systems.

A further object is to provide a safety device to prevent overheating of the heater utilized in the indicator.

Figure 1:
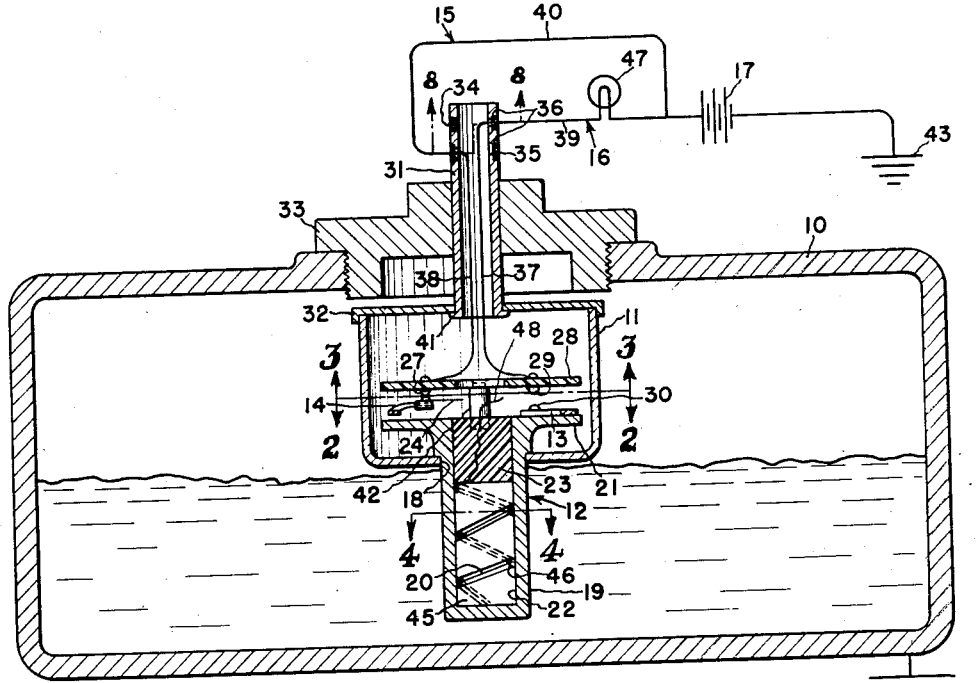
Figure 2:
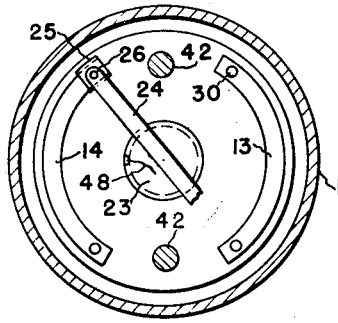
Figure 3:
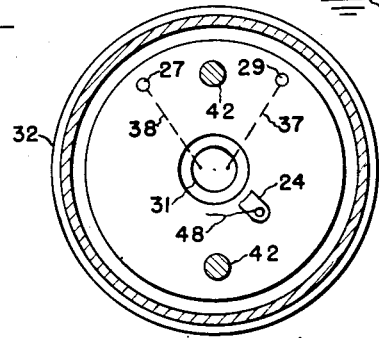
Figure 5:
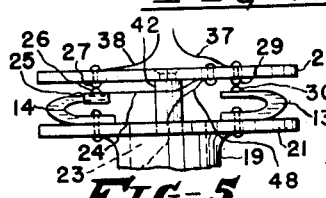
Figure 6:
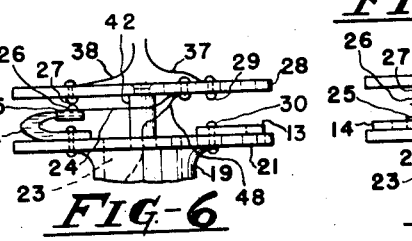
Figure 7:
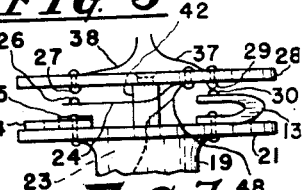
Figure 4:
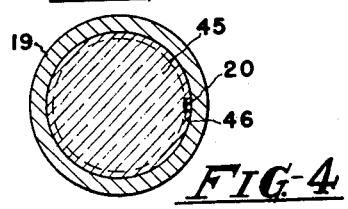
Figure 8:
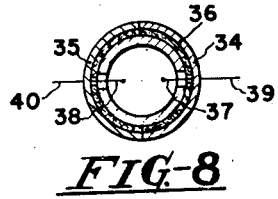

Other objects of the invention will become apparent from the following specification and drawings in which Figure 1 is a sectional elevation of a preferred form of the liquid level indicator and the associated electrical signal circuit, Fig. 2 is a transverse view taken through Figure 1 along the lines 2—2 looking in the direction of the arrows and shows the movable contact elements of the indicator, Fig. 3 is a transverse view through Figure 1 taken along the line 3—3 looking in the direction of the arrows, Fig. 4 is a transverse view taken through Figure 1 along the line 4—4 looking in the direction of the arrows and shows the heating unit of the indicator, Figures 5, 6 and 7 are side views of the movable contact elements shown in different operative positions, and Fig. 8 is a transverse view taken through Figure 1 along the line 8—8 looking in the direction of the arrows and showing the electrical contact rings on the indicator.

Referring to the drawings, Figure 1 shows a preferred form of the indicator mounted within a tank 10 partially filled with hydraulic fluid or other liquid. The indicator comprises, in general, a fluid tight container 11 to which is adapted a heater 12 projecting into the hydraulic fluid. Mounted within the container 11 are a pair of thermo-sensitive bi-metallic bars 13 and 14 which are actuated responsively to variations in temperature of the heater 12 to make and break a heater circuit 15 and a signal circuit 16.

During normal operating conditions, i. e., whenever the level of the liquid within the tank 10 is above some predetermined level, heat is conducted from the heater 12 by the surrounding liquid thereby preventing the temperature of the heater from exceeding some predetermined value; under these conditions the bar 14 maintains electrical connection between the heater 12 and a supply of electrical power such as the battery 17. In the event the liquid level should fall below some predetermined level so that a portion of the heater 12 is exposed to the air or any other medium having a coefficient of heat conductivity which is less than that of the liquid in the tank 10, then, due to the increase in temperature of the exposed portion of the heater, the bar 13 will deflect to complete the signal circuit 16 thereby giving warning that the level of the liquid within the tank 10 has fallen below the aforesaid predetermined level.

As a safety feature, the bi-metallic bar 14 is designed to deflect and break the heater circuit 15 whenever the temperature of the heater 12 exceeds some predetermined value thereby precluding any possibility of the heater or other elements of the indicator becoming excessively hot in the event the heater is entirely exposed to the air for a long period of time. In the preferred form of the indicator, the temperature value at which the bar 14 breaks the heater circuit is somewhat higher than the temperature value at which the bar 13 completes the signal circuit. Moreover, the temperature at which the bar 14 closes the heater circuit is somewhat higher than the temperature value at which the bar 13 opens the signal circuit. In operation this means that whenever the signal circuit is completed, the heater circuit can be intermittently interrupted without the signal circuit being broken.

Referring in greater detail to the indicator, the container 11 is in the form of a closed tubular member with a central perforation 18 in the bottom, or lower end, thereof. In the form of the invention illustrated, the container 11 is located within the tank 10 and is therefor made fluid tight to prevent seepage of fluid into the container. The container may, however, be located exteriorly of the tank 10 with the heater 12 extending into the tank, if desired, and in which case the container need not be fluid tight. Extending through the perforation 18 in the container is the heater 12 which comprises a hollow heat conducting member 19 having a closed outer end to house a heating unit or coil 20 located within that portion of the member 19 lying exteriorly of the chamber 11.

The opposite, or inwardly, end of the member 19 is flared outwardly in the form of a washer 21 on which are mounted the bi-metallic bars 13 and 14. In the preferred form of the invention, the bars 13 and 14 are riveted at one end to the member 19, or otherwise held in firm heat conductive contact therewith; and in furtherance to the end that the member 19 serve as a means for conducting the heat from the coil 20 to the bars 13 and 14, the thickness of the wall of the member 19 is relatively greater than the thickness of the wall of the container 11 so that a greater portion of the heat conducted along the wall of the member 19 is conducted to the washer 21 and the bi-metallic bars 13 and 14 rather than along the wall of the container 11.

Mounted in face relation with the washer 21 is a fiber, or plastic, plate 28 on which are mounted contact buttons 27 and 29 connected, respectively, in the power circuit 15 and signal circuit 16. The plate 28 is mounted in such wise relative to the washer 21 so that whenever the free ends of the bars 13 and 14 deflect to their upper limiting position, the signal and heater circuits, respectively, are completed. That is, the button 29 is contacted by a button 30 on the free end of the bar 13 whenever the bar 13 deflects into its upper—toward the plate 28—limiting position, and the insulated free end 25 of the bar 14 when deflected in the upwardly direction, as viewed in Figure 1, will contact and force in that direction the free end of a resilient electrically conducted strip, or bar, 24 mounted on the plate 28. The bar 14 in its upper limiting position holds a contact button 26 on bar 24 in contact with the button 27. The bar 24 is connected by a wire 48, which extends through a plastic plug 23 sealing the open end of the bore 22, to the coil 20 so that whenever the bi-metallic bar 14 assumes said limiting position, electrical connection is made between the heater 12 and the power circuit 15.

Such alignment of the contact button 27 with the button 26 and the button 30 with the button 29 is assured by the expedient of mounting the plate 28 on shoulder pins 42, press fitted in the washer 21. These pins 42 also maintain the proper distance between the plate 28 and the washer 21 so that contact is made and broken between such contact points, or buttons, at the required liquid levels aforesaid.

In the embodiment of the invention illustrated, the container 11 and associated heater and contact assembly is mounted within the tank 10 on a tube 31, press fitted in a plug 33, threaded in the tank 10. The lower or inner end of such tube 31 extends through a cover 32 for the container 11 and is provided with a shoulder 41 at its lower end upon which the inner surface of the cover 32 rests. It is to be noted in this connection that the diameter of the container 11, and the cover 32, is made somewhat less than the threaded diameter of the plug 33 so that the entire unit is readily inserted into the tank 10. Hence, the unit is readily adaptable to any existing hydraulic system provided with such tank, and it is merely necessary to drill a hole in the plug 33 and press fit the tube 31 therein.

Encircling the outer end, the upper end as viewed in Figure 1, of the tube 31 are a pair of metallic rings 34 and 35. These rings are insulated from the member 31 by means of insulation 36 thereby permitting one of the rings, in the drawing, ring 34, to be connected to the button 29 by means of a lead 37 extending along the interior of the member 31; and the other ring, ring 35, to be connected to the button 27 by a lead 38, hence any conventional electrical cap (not shown) may be slid over the contact rings 34 and 35. For the purpose of simplicity however, leads 39 and 40 in the signal and heater circuits, respectively, are connected directly to the rings 34 and 35.

Tracing the electrical circuits in detail, the heater circuit starting with ground connection 43 on the negative side of the battery 17, the positive side of the battery is connected through lead 40 to the ring 35 which in turn is connected by lead 38 to the button 27. Under normal operating conditions, the metallic bars 13 and 14 assume the position shown in Figure 6 and hence the conductive strip 24 is held in contact with the button 27 thereby connecting one end of the coil 20 with the battery 17. The opposite end of the coil 20 is connected to the lower end of the member 19 and the member 19 is grounded through the container 11, tube 31, plug 33 and tank 10 to the ground 44.

In order to prevent grounding the wire of the coil 20 against the side of the member 19, the porcelain plug 45 on which the coil is wound, is provided with grooves 46 of greater depth than the diameter of the wire in the coil 20. It is also to be noted in this connection, that although the coil 20 does not contact the member 19, other than at its point of connection at the bottom as previously mentioned, it is positioned immediately adjacent thereto so that the heat of the coil is readily conducted through the walls of the member 19 to the surrounding liquid.

Tracing the signal circuit 16, again starting from the ground 43 connected to the negative side of the battery 17, the positive side of the battery is connected by lead 39 to the contact button 29, a signal light 47 being connected in this lead 39. This circuit is completed through the bar 13—when the buttons 29 and 30 are in contact—the member 19, container 11, member 31, plug 33 and tank 10 to ground 44.

Reviewing the operation of the indicator, it will be assumed that the level of the liquid in the tank 10 is as shown in Figure 1, or in other words, that the heater 12 is substantially immersed in liquid. Under such a condition, the bi-metallic bars 13 and 14 will take the position shown in Figure 6—i. e., the bar 14 is deflected in the upward position to force the button 26 on the strip 24 into contact with the button 27 to make, or complete, the heater circuit, and the bar 13 is deflected to break, or disconnect, the signal circuit 16. In other words, the heater circuit 15 is completed so that the heater 12 generates a quantity of heat which, for the most part, is dissipated in heating the liquid in the tank 10.

In the event that the level of the liquid in the tank 10 falls below some predetermined level so as to expose at least a portion of the heat conducting member 19 to the air in tank 10, then a portion of the heat normally dissipated by the liquid is conducted by the wall of the member 19 to the washer 21 and hence to the bi-metallic bars 13 and 14. At some predetermined temperature of the washer 21, the bi-metallic bar 13 will deflect, in the upwardly direction as viewed in Figure 1, to establish contact between the buttons 29 and 30 and thereby complete the signal circuit 16 and causing the light 47 to glow to indicate that the liquid level in the tank 10 has fallen below the aforesaid predetermined level. Under these conditions, the bars 13 and 14 take the position shown in Figure 5.

If at this lower liquid level, the temperature of the heater 12 exceeds some predetermined value, a value at which there is a danger that the coil 20 will burn out or adjacent parts will be damaged, the bar 14 will deflect downwardly to break the heater circuit 15 (see Figure 7). Under these conditions, the heater 12 will be permitted to cool thereby precluding the burning out of the coil, but the bars 13 and 14 are so chosen that before the heater cools down to a temperature value at which the bar 13 will deflect to break the signal circuit 16, the bar 14 will again return to the position shown in Figure 5 to complete the heater circuit. In other words, the heater circuit 15 is periodically interrupted to prevent overheating of the heater 12, but these interruptions are of such short duration that the temperature of the washer 21 does not fall to a value which will permit the bar 13 to break the signal circuit.

It is also important to note in connection with the present invention, that the level indicating device is located with its center line coinciding with the center line of the tank 10 so that any inclination of the tank 10 with respect to the horizontal will not disturb the operation for the indicating device. For example, if the signal device were located at an end of the tank 10, inclination of the tank in a direction toward the indicator would permit the level of the liquid to fall below the danger point without the signal device operating the warning light 47, and inclination of the tank in the opposite direction would result in the indicator signaling a dangerous liquid level although an adequate quantity of liquid were present in the tank.

In view of the foregoing disclosure it is readily apparent that the present invention accomplishes, among others, the objects hereinbefore stated, and provides a liquid level indicator which is relatively simple in construction and comparatively inexpensive both in initial cost and upkeep. Moreover, due to its simplicity of construction and design, the possibility of the device becoming inoperable is minimized—an extremely important feature when it is realized that an indicating device such as this is often used as a warning indicator in which case one of the required features is that the operation of the device must be reliable. It is also important to note that the indicator herein disclosed may be readily adapted to existing fluid systems with little or no change in the system.

While we have shown and described a specific form of our invention, it is to be understood that various changes and modifications may be made without departing from the spirit of the invention as set forth in the appended claims.

We claim:

1. A fluid level indicator for use in an electrical signal circuit, comprising a container, a heater extending into the fluid the level of which is to be measured, means for conducting heat from the heater into the container, and a thermo-responsive element mounted in thermal contact with said means within said container and connected in the signal circuit, said elements being adapted to act in response to variations in temperature of said means for completing the signal circuit whenever the level of said liquid falls below some predetermined level and breaking said circuit whenever such level exceeds a predetermined level.

2. A fluid level indicator comprising a fluid tight container, a member in said container and having a pair of electrical contacts thereon for connection with a signal circuit and a source of power, a heat conducting member having an end located within said container and a portion projecting from the container into the fluid the level of which is to be measured, a heating unit positioned within said portion for heating said heat conducting member and sealed from contact with such fluid, a thermo-sensitive element mounted on said end of the heat conducting member and designed to maintain electrical contact between the heating unit and one of said electrical contacts whenever the temperature of the heat conducting member is below some predetermined value and to deflect and break such connection whenever the temperature of the heat conducting member exceeds said value, and another thermo-sensitive element mounted on said end of the heat conducting member and designed to deflect and contact the other of said contacts whenever the level of said liquid falls below some predetermined level and to deflect and break such contact whenever the level of such liquid rises above such point.

3. A fluid level indicator comprising a container, a heat conducting member adapted to said container and having a portion located within the container and a portion positioned exteriorly of the container in the fluid the level of which is to be measured, a member within the container and adjacent the first said portion of the heat conducting member and having an electrical contact point thereon for connection with a signal circuit, a heating unit positioned within the last said portion of the heat conducting member and sealed from contact with said fluid, and a thermo-sensitive member mounted on the first said portion of said heat conducting member and designed to deflect and contact said point whenever the level of said liquid falls below some predetermined level.

4. A liquid level indicator comprising, a source of electrical power, a signal circuit, a heater extending into the liquid the level of which is to be measured, a thermo-sensitive element acting responsively to variations in temperature of said heater to deflect and connect the heater to said source of power whenever the temperature of the heater is below some predetermined value and to deflect and disconnect the heater from said power source whenever the temperature of the heater is above said value, and a second thermo-sensitive element responsive to variations in temperature of said heater to make and break the signal circuit in accordance with the level of such liquid.

5. A liquid level indicator comprising, a source of electrical power, a signal circuit, a liquid tight container, a heat conducting member having a portion located within said container and a portion extending into the liquid the level of which is to be measured, a heating coil positioned within the last said portion of the member and connected to said power source, an electrical contact point positioned within said container and connected in said signal circuit, and a thermo-sensitive element adapted to the first said portion of the heat conducting member and responsive to variations in temperature thereof to deflect and contact said point to complete the signal circuit whenever the level of such liquid falls below a predetermined level.

6. A fluid level indicator for a tank containing a liquid, comprising a fluid tight container within the tank, a heat conducting member mounted on said container and having a flatted end portion located within the container and the other end portion of said member projecting into the liquid the level of which is to be measured, a heating coil in the last said portion of the member and sealed therein from contact with such liquid, a plate positioned within said container and having a contact thereon for connection with a signal circuit, supports mounted on said member and connected to hold said plate in spaced relation with said flatted portion, a thermo-sensitive element secured in heat conducting relation to said flatted portion and arranged to deflect and engage said contact to operate the signal circuit whenever the level of the liquid falls below a predetermined level.

7. A fluid level indicator for a tank containing a liquid, comprising a fluid tight container within the tank, a heat conducting member mounted on said container and having a flatted end portion located within the container and the other end portion of said member projecting into the liquid the level of which is to be measured, a heating coil in the last said portion of the member and sealed therein from contact with such liquid, a plate positioned within said container and having thereon a contact for connection with a signal circuit and a contact for connection with a heater circuit, supports mounted on said member and connected to hold the plate in spaced relation with said flatted portion, a thermo-sensitive element for connection in the signal circuit and secured in heat conducting relation to said flatted portion, said element being adapted to deflect and engage the first said contact and to deflect and move out of engagement with such contact in response to variations in the level of the liquid to be measured, and a second thermo-sensitive element connected to said heating coil and secured in heat conducting relation to said flatted portion and arranged to deflect and engage the second said contact to complete the power circuit whenever the temperature of said heater falls below a predetermined value and to deflect and break the power circuit whenever the temperature of the heater exceeds a predetermined value.

DAVID SEBASTIAN.
BERNT J. HEGGEN.
ROBERT H. HAMPTON.

REFERENCES CITED

The following references are of record in the file of this patent:

UNITED STATES PATENTS

| Number | Name | Date |
|---|---|---|
| 1,055,882 | Cubitt | Mar. 11, 1913 |
| 1,682,448 | Vaughan | Aug. 28, 1928 |
| 1,954,147 | Shroyer | Apr. 10, 1934 |